United States Patent [19]
Trevisan et al.

[11] 3,958,073
[45] May 18, 1976

[54] PROPERTIES OF GLASS SURFACES

[75] Inventors: Gianfranco Trevisan, Fidenza; Francesco Mascaro, Pizzighettone; Corrado Brichta, Milan, all of Italy

[73] Assignee: Fidenza S.A. Vetraria S.p.A., Milan, Italy

[22] Filed: July 9, 1973

[21] Appl. No.: 377,655

Related U.S. Application Data

[63] Continuation-in-part of Ser. No. 110,278, Jan. 27, 1971, abandoned.

[30] Foreign Application Priority Data

Jan. 29, 1970 Italy .................................. 19920/70

[52] U.S. Cl. .............................. 428/427; 65/30 R; 260/46.5 E; 427/387; 427/399; 428/429; 428/447
[51] Int. Cl.² ................. B32B 17/10; C03C 17/30
[58] Field of Search ............... 117/124 F; 161.2 A, 117/118; 260/46.5 E; 428/429, 447, 427; 427/399, 387; 65/30

[56] References Cited
UNITED STATES PATENTS

| | | | |
|---|---|---|---|
| 2,851,439 | 9/1958 | Clark | 260/46.5 E |
| 3,032,439 | 5/1962 | Muller | 117/124 F |
| 3,334,066 | 8/1967 | Lamoreaux | 260/46.5 E |
| 3,336,158 | 8/1967 | Wada | 117/124 F |
| 3,415,778 | 12/1968 | Burzyuski | 260/46.5 E |
| 3,423,234 | 1/1969 | Heine | 117/124 F |
| 3,522,075 | 7/1970 | Kiel | 117/124 F |
| 3,567,750 | 3/1971 | Wade | 117/124 F |
| 3,667,926 | 6/1972 | Green | 117/124 D |

FOREIGN PATENTS OR APPLICATIONS 705,854  3/1965  Canada.......................... 117/124 F

OTHER PUBLICATIONS

Guidina et al., J. Poly. Sci., USSR, "Synthesis of Boronsiloxane Polymers ..." Vol. 11, No. 2, 1969, pp. 426–431 (pp. 482–488 in translation).

*Primary Examiner*—Ronald H. Smith
*Assistant Examiner*—William H. Schmidt
*Attorney, Agent, or Firm*—Stevens, Davis, Miller & Mosher

[57] ABSTRACT

Glass having improved hydrolytic and chemical resistance as well as improved water repellency and mechanical characteristics is obtained by reacting the glass surface with an organoborosiloxane polymer, substituted by one or more of alkyl, aryl, alkoxy, acyl radicals, said organoborosiloxane polymer containing no free hydroxy groups in the presence of one or more organic Ti, Zr, Sn, v compounds at a temperature comprised between 200° and 400°C in order to obtain, through a grafting reaction, a superficial layer of modified glass.

15 Claims, No Drawings

PROPERTIES OF GLASS SURFACES

This is the continuation in part of the copending application Ser. No. 110,278 filed Jan. 27, 1971 by Trevisan et al. now abandoned.

The present invention concerns a process for improving the properties of glass surfaces.

It is known that glass surfaces, and more particularly soda-lime glass, are subject to corrosion caused by the action of water or moisture. This chemical corrosion must be ascribed to the removal of alkalies present on the surface of the glass and to the formation of free hydroxyls which determine its wettability characteristics and the reduced hydrolytic and chemical resistance.

It is quite evident that the properties of a glass containing alkalies are related to the content of alkalies of the surface, whereby a reduction of the concentration in sodium oxides of the superficial layer also influences the electrical conductivity characteristics.

Moreover, as a consequence of the superficial corrosion of the glass, other drawbacks are also encountered such as a lower mechanical resistance due also to the presence of micro-cracks in the glass surface, greater dirt adherence and an unfavourable glass-to-glass friction coefficient.

Numerous processes are known for making the glass surface water-repellent by means of coating the surface with a film made of silicone compounds. Such a treatment, however, has not found a widespread practical application in as much as the presence of alkaline ions on the surface of industrial glass is responsible for the slow destruction of the silicone film when the latter is exposed to a moist atmosphere.

There has also been proposed the use of air-drying varnishes based on organosiliconic resins in the presence of suitable curing catalysts.

Such varnishes, containing hydroxyls groups, produce by coating a protective film of variable thickness, cured by reticulation reaction. The use of organoborosiloxane polymers, not containing free hydroxyl groups, but substituted with vinyl groups, in order to obtain a rubber-like cured siliconic coating is also known. These methods have however the drawbacks of not insuring a sufficient adherence of the coating to the glass. Furthermore said cured coatings can be easily removed mechanically from the glass surface.

In order to improve the abrasion and scratch resistance of the surface there has also been suggested treatment of the glass surface with metal containing organic compounds, particularly with compounds containing titanium, operating at sufficiently high temperatures so as to cause the pyrolysis of the compound and the formation of the corresponding metal oxide on the surface of the glass.

Subsequently, at a lower temperature, there is then applied a special fluorosilicone compound suitable for forming a transparent and uniform film on the glass surface.

This treatment, though it results in improvement of some of the superficial characteristics of the glass, does not, however, result in an appreciable increase of the corrosion resistance. Moreover, the process involves a major burden in as much as it requires two separate operations.

Thus, one object of this invention is that of providing a transparent protective superficial layer of a thin thickness chemically grafted onto the surface of the glass so as to impart to the glass itself improved characteristics of hydrolytic and chemical resistance.

A further object of this invention is that of providing a method for imparting to glass surfaces improved water-repellent properties with a consequential drop of the surface electrical conductivity.

Still another object of this invention is that of providing a protective superficial layer of modified glass suited for improving the mechanical properties of the glass by imparting a greater abrasion and scratch resistance.

Still another object of this invention is that of providing a protective superficial layer that will possess lubricating properties and that, therefore, will impart to the surfaces a low coefficient of friction between glass-to-glass surfaces.

These and still other objects are attained through the method of this invention which comprises applying to the glass surface particular organoheterosiloxane polymers in the presence of particular organic compounds containing metal atoms, in subjecting the surface to a thermal treatment, thereby obtaining a reaction product between the heterosiloxane polymer and the organic compound containing metal atoms, which product is chemically grafted on the glass surface.

The term heterosiloxane means an organoborosiloxane polymer not containing free hydroxyl groups substituted by one or more of the following radicals equal or different from each other: alkyl, aryl, alkoxy, acyl and alkyl, whose hydrogen atoms may be either partially or totally substituted by fluorine atoms. Said organoborosiloxane polymers must be absolutely lacking in hydroxyl groups, in order to avoid the reticulation reaction and the consequent formation of cured coatings.

The organoborosilicon composition of this invention can therefore have any monovalent hydrocarbon radicals and any alkoxy group or acyl group attached to the silicon atoms thereof. Thus, monovalent hydrocarbon radicals are for example methyl, ethyl, octadecyl, stearyl, phenyl, tolyl, benzyl, and xylyl, while specific examples of operative alkoxy radicals can be methoxy, ethoxy, isopropoxy or stearyloxy and the acyl groups can be the acetoxy, propionoxy, butyroxy, etc. and aryloxy e.g. benzoxy. Preferably the monovalent hydrocarbon radicals are alkyl radicals of less than 5 carbon atoms. It is also preferred that the alkoxy radicals contain less than 5 carbon atoms.

The alkoxylated organoborosilicon compounds of this invention may be prepared by conventional methods for preparing such compounds.

The organoborosiloxane polymer is dissolved or dispersed in organic solvents, preferably inert, in the presence of an organic compound containing metal atoms, and the solution or dispersion is then applied to the surface of the glass so as to form a thin and uniform layer.

After evaporation of the solvent, the vitreous surface is subjected to a heat treatment at a temperature generally comprised between 200° and 400°C, but preferably comprised between 280° and 400°C. The temperature is chosen in such a way as to cause the thermal decomposition of the organic compound containing the metal atoms, but it must not be such as to cause the decomposition of the organic radicals of the heterosiloxane polymer. After the thermal treatment, a metallo-siloxane polymer is found to have been chemically grafted on the glass surface.

Practically, the mixture of organoborosiloxane polymers with an metalloorganic compound can be applied on the still hot glass surface, when its temperature is in the above mentioned range.

This method has found useful application in the superficial treatment of sheet glass and in the treatment of the external surfaces of bottles amongst other uses. Particularly suitable for the superficial treatment of insulators and of the inside surfaces of containers for pharmaceutical products are the fluorinated organoborosiloxane polymers.

Usually the duration of the treatment is comprised between half an hour and a few minutes, depending on the temperature and the compounds used.

The organoborosiloxane polymer may be obtained according to procedures of the prior art by means of the reaction of, for example, a polydimethyl-siloxane with a boron compound, such as for instance: boron oxide, orthoboric acid, tetraboric acid, pyroboric acid and esters of boric acids condensable at a temperature between 200° and 280°C, so as to obtain the group

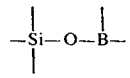

in which there is preferably a stoichiometric ratio comprised between 100 and 500 atoms of Si per atom of boron.

Particularly suitable are the organoborosiloxane containing alkyl groups partially or totally substituted with fluorine atoms, for instance: γ-trifluoropropyl radicals. Such organopolyborosiloxanes are obtained by the reaction of boron oxide with fluorosilicone oils having, for instance the following structure:

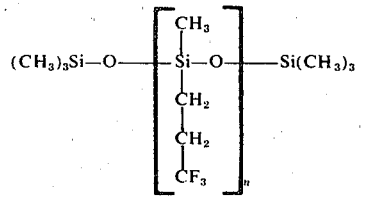

wherein $n$ is between 1 and 6,000 and where the viscosity at 25°C is preferably between 300 and 10,000 cs; or the fluorosilicone oils of the following structure:

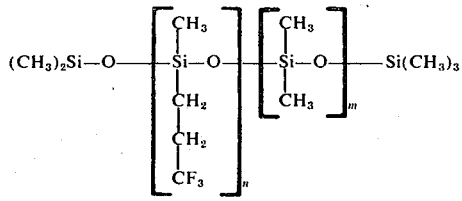

wherein $n$ is between 1 and 6,000 and $m$ is between 0 and 6,000 while the viscosity at 25°C is preferably between 300 and 10,000 cs. There may also be used organopolysiloxanes not containing fluorine atoms, for instance, having the above cited general structure wherein $n = 0$ and $m$ is between 1 and 6,000, and having a viscosity at 25°C between 300 and 10,000 cs.

Amongst the organic compounds containing metal atoms particularly for the cross-linking reaction, according to this invention, there may be listed organic Ti, Zr, Sn and V compounds capable of polycondensating. Amongst the Ti compounds there may be listed the esters of titanic acid soluble in organic solvents. It is to be understood that within the scope of this invention there are included the monomeric esters of titanic acid containing 4 alkoxy radicals per titanium atom [Ti(OR)$_4$], as well as the polymeric derivatives containing less than 4 of the above-mentioned radicals per titanium atom. In this latter case the polymers may be formed of partially hydrolyzed esters containing

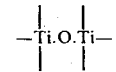

linkages, as well as by esters of titanium and polyvalent alcohols containing linkages of the type

Specific examples of titanic esters which can be used according to this invention, are the esters of monofunctional alcohols such as methyl, ethyl, allyl, isopropyl, butyl, cyclohexyl, octyl, ethylhexyl - alcohols and the esters of bifunctional alcohols such as the ethylene-glycols, propylene-glycols, actylene-glycols, diethylene-glycols, tripropylene-glycols and the tetraethylene-glycols, and the esters of trifunctional alcohols such as glycerine. There may also be used titanium esters suited for forming complexes, chelates with acetylacetone, such as for instance the acetoacetic ester of dibutyloxytitanium.

Amongst the zirconium compounds there may also be listed the esters of zirconic acid soluble in organic solvents. Included therein are the monomeric esters containing 4 alkoxy radicals per zirconium atom [Zr(OR)$_4$] and, moreover, the polymeric derivatives containing less than 4 of the above-indicated radicals per zirconium atom. In such a case, the polymers may consist of partially hydrolyzed esters containing

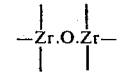

linkages as well as esters of polyvalent alcohols containing linkages of the

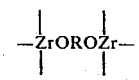

type. For this purpose there may also be used the chelates of the zirconic acid esters with acetylacetone, for instance zirconium acetylacetonate, as well as the mixed condensates of titaniczirconic acid esters such as butylacetyl-titanate zirconate. In general the alcohols from which may be derived the zirconic acid esters are the same as those already listed for the titanic acid esters.

Amongst the tin compounds may be listed the tin esters soluble in organic solvents. Particularly suited for the purpose are the compounds containing tetravalent tin such as the tin alcoholates such as for instance tin-IV-ethylate, as well as the tin chelates, the tin-dialkyl-carboxylates inclusive of those having the general formula: $R_2Sn(OOCR')_2$, wherein R and R' are alkyl groups, R preferably contains between 1 and 8 carbon atoms, and R' preferably contains from 2 to 18 carbon atoms.

Other organic tin compounds soluble in inert organic solvents and suitable for the purpose are the diacetoxy-stannanes, for instance: di-isobutyl-acetoxy-stannane, $(C_4H_9{}^i)_2Sn(O.CO.CH_3)_2$.

According to this invention, amongst the vanadium compounds there may be used, for instance, triethoxy-vanadyloxide (triethylvanadate) as well as vanadylacetylacetonate.

The quantity of organic compound containing metal atoms required for the grafting of the organoborosiloxane polymer, varies within certain limits in as much as it depends on the Si:B stoichiometric ratio; at any rate, it may vary between a ratio corresponding to 1 boron atom per metal atom and up to a ratio equivalent to 1 boron atom per 10 metal atoms.

As inert organic solvents proved to be particularly suitable are ketones such as methylethyl-ketone, acetone methyl-isobutylketone, acetylacetone, esters such as ethyl acetate, butyl acetate, cellosolve, as well as mixtures thereof. Particularly suited as diluent liquids are chlorinated organic fluids such as for instance carbon tetrachloride, trichloroethylene and perchloroethylene as well as aromatic hydrocarbons such as benzene, toluene and xylene.

The treatment of the glass surface may be carried out according to any of the known techniques such as spraying, dipping, brushing, etc. The treated glass surface, according to our invention, after the thermal grafting reaction, is provided with an extremely thin modified glass layer, whose thickness may vary from 1 to 0.5 $\mu$ or even less.

The following examples are given in order to more clearly illustrate the invention:

EXAMPLE 1

A mixture consisting of 99.4 g of a fluosilicone oil (FS 1265 fluid manufactured by Dow Corning) containing methyl and $\gamma$-trifluoropropyl radicals linked to the same silicon atom having a viscosity of 1000 cs at 25°C, and 0.6 g of boron oxide was heated under stirring at a temperature of from 210° to 250°C.

After about six hours there was formed the fluorinated borosiloxane polymer which was then cooled down to room temperature and then dissolved in about 4000 ml of methylethylketone as the inert solvent, in which had been previously dissolved 4.3 g of tetrabutyltitanate polymer having a molecular weight of about 1400.

This solution, containing the borosiloxane polymer and the tetrabutyltitanate polymer as cross-linking agent, was applied uniformly by spraying onto the surface of the glass sheet.

After drying in the air at 80°C for 10 minutes, the solvent was completely evaporated and the glass sheet was subjected to a heat treatment for half an hour at a temperature of between 290° and 300°C. Thereupon it was left to cool down to room temperature.

After the above described treatment, the surface of the glass showed good water-repellent characteristics and good corrosion resistance as well as good scratch and abrasion resistance. The glass surfaces treated according to the above-described method were subjected to various control tests and comparative tests in order to evaluate the effectiveness of the corresponding coatings, and the results obtained were as follows:

A. Determination of the contact angle between water and glass.

| SURFACE TREATMENT | MEAN VALUES OF THE ANGLE OF CONTACT |
| --- | --- |
| Untreated glass surfaces | $\theta =$ about 0° |
| Glass surfaces protected by means of siliconizing process | $\theta = 80°$ |
| Glass surfaces treated with fluorinated borosiloxanes polymer in the absence of the organic Ti compound (the treatment is identical with the one described herein above for the composition containing the organic Ti compound). | $\theta = 74°$ |
| Glass surfaces treated with the fluorinated borosiloxane polymer in the presence of tetrabutyltitanate polymer | $\theta = 65°$ |

The contact angles, measured again after hydrolytic attack of the glass surfaces in an autoclave at 121°C for 30 minutes were as follows:

| | |
| --- | --- |
| Glass surfaces protected by the siliconizing method | $\theta = 46°$ |
| Glass surfaces treated with fluorinated borosiloxane polymer in the absence of an organic Ti compound | $\theta = 32°$ |
| Glass surfaces treated with fluorinated borosiloxane polymer in the presence of tetrabutyltitanate polymer | $\theta = 65°$ |

As can be seen from the above, the contact angle remains practically unvaried after hydrolytic attack only in the case of the sample treated according to the process of this invention.

B. Determination of chemical resistance after attack for 1 hour in an autoclave at 121°C.

For the chemical resistance tests there were prepared samples of equal dimensions, 30 × 30 × 4.65 mm obtained from glass sheet.

These samples supported by a platinum wire basket were completely dipped into quartz glasses containing 200 ml of twice distilled water and maintained for 30 minutes in an autoclave at a temperature of 121°C. Titration of the aqueous extract was then carried out for total alkalinity and the sodium oxide content was determined by flame photometry. The results thereby obtained are reported as follows:

| SUPERFICIAL TREATMENTS | $Na_2O$ EXTRACTED (TITRATION) | $Na_2O$ EXTRACTED (FLAME PHOTOMETRY) |
| --- | --- | --- |
| Untreated glass surfaces | 0.30 mg/dm$^2$ | 0.26 mg/dm$^2$ |
| Glass surfaces protected by siliconizing | 0.25 mg/dm$^2$ | 0.23 mg/dm$^2$ |
| Glass surfaces treated with polyborosiloxane in the absence of tetrabutyltitanate polymer | 0.28 mg/dm$^2$ | 0.26 mg/dm$^2$ |
| Glass surfaces treated with fluorinated polyborosiloxane in the presence of tetrabutyltitanate polymer | 0.09 mg/dm$^2$ | 0.11 mg/dm$^2$ |

As far as the effectiveness of the superficial coating obtained according to this invention is concerned, it appears quite clear from the above recorded values that, with respect to the chemical extractability this method must be considered the best.

C. Flexural strength test

Flexural strength tests were carried out on many parallelepiped samples of perfectly identical size (90×7×4.65 mm), using the apparatus hereunder described.

The apparatus consisted of two ground cylinders that serve as supports and of a ground cylindrically shaped knife that transmits the load to the small bars. The supports have reference lines for the perfect centering of the small bars. The distance between the supports equals 6.2 mm. The central knife has two hooks which carry a container into which are introduced at an adjustable speed lead balls of 1.3 mm diameter.

The tests were carried out on 20 small bars of all types, with a central load and a rate of application of 2.5 kg/min. The results of these tests were the following:

| SUPERFICIAL TREATMENT | MEAN ULTIMATE FLEXURAL STRENGTH |
| --- | --- |
| Untreated glass surfaces | 6.5 kg/mm$^2$ |
| Glass treated with fluorinated polyborosiloxane in the presence of tetrabutyltitanate polymer | 7.6 kg/mm$^2$ |

D. Determination of the resistance to scratch under dry and humid environmental conditions.

The surfaces of a bottle of glass treated according to the process suggested herein above, were subjected to scratch and abrasion resistance tests, using the apparatus briefly described hereunder.

A bottle was securely fastened to a series of fixed lower mandrels, while a second bottle was fixed to a series of upper mandrels which are arranged in such a way that the axes of the bottles were positioned at 90° with respect to each other.

To the upper bottle was then applied a sample weight while the bottle was dragged along at a constant speed of 71 mm/minute in a 45° direction with respect to the axis of each bottle. The scratch rate was about 50 mm/min.

The base of each bottle moves in the direction of the motion and therefore the scratch spreads from the shoulder toward the base of the bottle. The force exerted by the second bottle is a known, measured force and after each run with increasing weights, the extent of the scratch is inspected.

The resistance to scratching may be measured either by the dry or wet method. In this latter case the measuring is carried out after having wetted the surface of the bottle with water.

In the following are given the mean scratch resistance values for bottles untreated and treated with fluorinated borosiloxane polymer in the presence of tetrabutyltitanate polymer.

It will be noted that the scratch resistance is considerably higher for the treated samples. The measuring is carried out on the basis of the load required for the formation of the scratch which is then revealed by a standard enlarging apparatus.

| SURFACES | DRY TEST WITH LOAD IN KG. | WET TEST WITH LOAD IN KG. |
| --- | --- | --- |
| Surface of untreated bottle | 2.4 | — |
| Surface of bottle treated with fluorinated polyborosiloxane polymer, in the presence of tetrabutyltitanate polymer | 41.4 | 23.2–24.5 |

EXAMPLE 2

A mixture consisting of 99 g of a polydimethylsiloxane (Silicone Fluid 200 of Dow Corning, dimethylsiloxane oil) having a viscosity of 300 cs at 25°C, and of 1 g of boron oxide was heated under stirring at a temperature of 210°–230°C. After 8 hours the reaction product was cooled down to room temperature and was then dissolved in 5.6 liters of benzene in which there had been previously dissolved 8 g of tetrabutyltitanate polymer with a molecular weight of about 1400.

Thereupon the solution thus obtained was applied to the surfaces of glass samples by means of dipping. After evaporation of the solvent there was applied the thermal treatment as in the preceding example. The treated surfaces were thereby coated by a perfectly transparent protective film, firmly grafted on the glass surfaces to which it gave a special hydrolytic and chemical resistance.

The operational procedures for the tests were the same as those described in Example 1.

The table hereunder summarizes the data yielded by the tests carried out on the treated samples.

| | |
| --- | --- |
| Contact angle of water on glass | $\theta = 70°$ |
| Contact angle after hydrolytic attack at 121°C | $\theta = 70°$ |
| Na$_2$O extracted (titration) | 0.08 mg/dm$^2$ |
| Na$_2$O extracted (flame photometry) | 0.08 mg/dm$^2$ |
| Mean ultimate flexural strength | 7.9 kg/mm$^2$ |
| Scratch test (dry method) | 42.1 kg |
| Scratch test (wet method) | 21 – 23 kg |

EXAMPLE 3

A mixture consisting of 99 g of fluorosilicone oil (Fluid FS 1265 of Dow Corning) having a viscosity of 1000 cs at 25°C, and of 1 g of boron oxide, was heated under stirring at a temperature of about 260°C. After 6 hours the reaction product was cooled down to room temperature and was then dissolved in about 2 liters of carbon tetrachloride in which had been previously dissolved 8 g of tetrabutylzirconate monomer.

Thereupon the glass surface was subjected to spraying and, after evaporation of the solvent, there was applied the thermal treatment at a temperature comprised betwen 280° and 310°C, for one-half an hour.

The treated surface was covered by an extremely thin and perfectly transparent film firmly grafted on the glass surface.

The operational procedures of the tests were the same as those described in Example 1.

The following table summarizes the data of the tests carried out on the treated samples.

| | |
| --- | --- |
| Contact angle of water on glass | $\theta = 68°$ |
| Contact angle after hydrolytic attack at 121°C | $\theta = 65°$ |
| Na$_2$O extracted (titration) | 0.06 mg/dm$^2$ |
| Na$_2$O extracted (flame photometry) | 0.08 mg/dm$^2$ |

| | |
|---|---|
| Mean ultimate flexural strength | 7.7 kg/mm² |
| Scratch test (dry method) | 40.8 kg |
| Scratch test (wet method) | 20 – 22 kg |

EXAMPLE 4

10 g of oxy-bis-(diacetoxyborane) were heated to boiling temperature, under constant stirring, together with 140 g of tetraethoxysilane. The mixture was kept refluxing for about 20 minutes until there was obtained a clear solution. This solution was then left to cool down to room temperature, whereupon the reaction product polymer was dissolved in 8 lt. of ethyl acetate in which had been previously dissolved 10 g of butyl acetyltitanate-zirconate.

Thereupon the glass surfaces were spray-coated and, after evaporation of the solvent, they were subjected to thermal treatment at 400°C for 10 minutes. This heat treatment confers to the glass surfaces a special abrasion resistance.

The operational procedures for the tests are the same as those described in Example 1.

The following table summarizes the data of the tests carried out on the treated samples.

| | |
|---|---|
| Contact angle of water on glass | θ = 56° |
| Contact angle after hydrolytic attack at 121°C | θ = 54° |
| Na₂O extracted (titration) | 0.09 mg/dm² |
| Na₂O extracted (flame photometry) | 0.10 mg/dm² |
| Mean ultimate flexural strength | 7.4 kg/mm² |
| Scratch test, dry method | 39 kg |
| Scratch test, wet method | 20 – 22 kg |

EXAMPLE 5

A mixture consisting of 99.4 g of a fluorosilicone oil (Fluid FS 1265 of Dow Corning) having a viscosity of 1000 cs at 25°C, and of 0.6 g of boron oxide, was heated under stirring at a temperature of 210°–250°C. After about 6 hours, there was formed a fluorinated borosiloxane polymer which was then cooled down to room temperature and dissolved in about 4000 ml of methylethylketone as an inert solvent, in which had been previously dissolved 10 g of triethylvanadate.

This solution containing the borofluorosiloxane polymer and the triethylvanadate as a crosslinking agent was applied by spraying in a uniform manner onto the surfaces of sheet glass.

After drying at 80°C for about 15 minutes, the solvent was fully evaporated and the glass sheet was subjected to a heat treatment at about 300°C.

The treated surfaces were thus covered with a perfectly transparent protective film, firmly grafted onto the glass surface.

The operational procedures for carrying out the tests were the same as those described in Example 1.

The following table summarizes the data of the tests carried out on the samples treated.

| | |
|---|---|
| Contact angle of water on glass | θ = 62° |
| Contact angle after hydrolytic attack at 121°C | θ = 60° |
| Na₂O extracted (titration) | 0.06 mg/dm² |
| Na₂O extracted (flame photometry) | 0.08 mg/dm² |
| Mean ultimate flexural strength | 7.9 kg/mm² |
| Scratch test, dry method | 41' kg |
| Scratch test, wet method | 22 – 23 kg |

EXAMPLE 6

9.5 of phenylboric acid and 169.5 g of diphenylsilanediol were heated under stirring for 18 hours at 260°C.

There was obtained a polyborosiloxanic compound which was dissolved in 10 liters of benzene in which there had been previously dissolved 28 g of di-isobutyl-diacetoxystannate $(C_4H_9^i)_2Sn(O.CO.CH_3)_2$.

The above described solution was then applied by spraying onto the glass surfaces and, after evaporation of the solvent in the air, there was carried out a thermal treatment for one-half an hour at a temperature of 280°C.

The operational procedures followed in the tests were the same as those described in Example 1. The following table summarizes the data of the tests carried out on the treated samples.

| | |
|---|---|
| Contact angle of water on glass | θ = 64° |
| Contact angle after hydrolytic attack at 121°C | θ = 62° |
| Na₂O extracted (titration) | 0.10 mg/dm² |
| Na₂O extracted (flame photometry) | 0.12 mg/dm² |
| Mean ultimate flexural strength | 7.5 kg/mm² |
| Scratch test, dry method | 38 kg |
| Scratch test, wet method | 19 – 21 kg |

What is claimed is:

1. Process for imparting to glass surfaces a greater hydrolytic and chemical resistance, with water-repelling properties and improved mechanical characteristics, wherein the glass surface is treated with an organoborosiloxane polymer substituted by one or more radicals selected from the group consisting of alkyl, aryl, alkoxy and acyl radicals, said radicals being the same or different, said organoborosiloxane polymer containing no free hydroxyl groups, in the presence of one or more organic Ti, Zr, Sn, V compounds, and whereby the stoichiometric ratio of the metal to boron is comprised between 1:1 and 10:1, at a temperature of the glass comprised between 200° and 400°C, to thereby obtain a reaction product from the reaction between the organoborosiloxane polymer and the organic compound containing metal atoms, said reaction product being in the form of an extremely thin layer chemically grafted onto the glass surface.

2. Process according to claim 1, wherein the organoborosiloxane polymer is substituted by alkyl radicals and the hydrogen atoms of the alkyl radicals are at least partially substituted by fluorine atoms.

3. Process according to claim 1 wherein the stoichiometric ratio Si:B of the organoborosiloxane polymer is between 100:1 and 500:1.

4. Process according to claim 1, wherein the organoborosiloxane polymer is a polydimethylborosiloxane.

5. Process according to claim 1, wherein the organoborosiloxane polymer contains γ-trifluoropropyl radicals.

6. Process according to claim 1, wherein the organic compounds containing metal atoms are Ti compounds selected from the group consisting of monomeric esters of titanic acid containing 4 alkoxy radicals per atom of titanium, Ti(OR)$_4$, wherein R is alkoxy, and polymeric derivatives thereof containing less than 4 of the above mentioned radicals per Ti atom.

7. Process according to claim 1, wherein the organic compounds containing metal atoms are monomeric esters of zirconic acid containing 4 alkoxy radicals per atom of zirconium, Zr(OR)$_4$, wherein R is alkoxy, and polymeric derivatives thereof containing less than 4 of the above mentioned radicals per zirconium atom.

8. Process according to claim 1, wherein as organic compound containing metal atoms there is used a butylacetyl-titanate-zirconate.

9. Process according to claim 1, wherein the organic compound is alcoholated tin.

10. Process according to claim 1, wherein the organic tin compounds are dialkyltincarboxylates of the formula R$_2$Sn(OOCR')$_2$, wherein R and R' are alkyl group.

11. Process according to claim 1, wherein as the organic tin compound there is used a diacetoxystannane.

12. Process according to claim 1, wherein the organic vanadium compound is triethylvanadate.

13. Process according to claim 1 wherein the heating is carried out at temperatures between 280° and 400°C.

14. Process according to claim 1, wherein the thickness of the modified glass layer is from 0.5 to 1.

15. Glass surfaces treated according to the process of claim 1.

* * * * *